(12) United States Patent
Srinivasa et al.

(10) Patent No.: US 8,051,018 B1
(45) Date of Patent: Nov. 1, 2011

(54) METHOD FOR THE DESIGN AND OPTIMIZATION OF MORPHING STRATEGIES FOR RECONFIGURABLE SURFACES

(75) Inventors: Narayan Srinivasa, Oak Park, CA (US); Richard Stewart Ross, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 936 days.

(21) Appl. No.: 11/999,427

(22) Filed: Dec. 4, 2007

(51) Int. Cl.
G06F 15/18 (2006.01)
G06N 3/12 (2006.01)
G06N 7/06 (2006.01)

(52) U.S. Cl. .............................. 706/13; 706/14; 706/19
(58) Field of Classification Search .................... 706/13
See application file for complete search history.

(56) References Cited

U.S. PATENT DOCUMENTS 7,550,189 B1  6/2009 McKnight et al.

OTHER PUBLICATIONS

Evans et al. (Evans), "Design and optimization of an irradiance profile-shaping system with a genetic algorithm method", 1998, pp. 5216-5221.*
Giráldez, et al. (Giráldez), Natural Coding: A More Efficient Representation for Evolutionary Learning [online], 2003 [retrieved on Feb. 10, 2011]. Retrieved from the Internet: <http://www.springerlink.com/content/1x8dj6fvma4k21w8/fulltext.pdf>.*
Hetrick, J., and Kota, S., "An Energy formulation for parametric size and shape optimization of compliant mechanisms," ASME Journal of Mechanical Design, vol. 121, pp. 229-234, 1999.

Ananthasuresh, G.K., Kota, S. and Kikuchi, K, "Strategies for systematic synthesis of compliant MEMS," ASME Winter Annual Meeting, vol. 55, pp. 677-686, 1994.
Lu, K., and Kota, S., "Design of compliant mechanisms for morphing structural shapes," Journal of Intelligent Material Systems and Structures, vol. 14, pp. 379-391, Jun. 2003.
Goldberg, D., Genetic Algorithms in Search, Optimization, and Machine Learning, pp. 1-57, Addison Wesley, 1989.
Austin, F., Siclari, M. J., Van Nostrand, W., Weisensel, G.N., Kottamusu, V., and Volpe, G., "Comparison of Smart Wing concepts for transonic cruise drag reduction," SPIE Proceedings, vol. 3044, pp. 33-40, 1997.
York, A. R., Slusky, D., and Schreyer, H.L., "The material point method for simulation of thin membranes," Int. J. Numer. Meth. Eng., 44, 1429-1456, 1999.

(Continued)

*Primary Examiner* — Jeffrey A Gaffin
*Assistant Examiner* — Nathan Brown, Jr.
(74) *Attorney, Agent, or Firm* — Tope-McKay & Assoc.

(57) ABSTRACT

The present invention relates to a method for optimizing the design of a shape morphing structure using a genetic algorithm. The method includes defining design parameters of a surface having variable properties into a chromosome. The variable properties of the chromosome are the actual properties of the chromosome. The chromosome has a total of Nmax genes, where each gene corresponds to a variable property element in the surface. Additionally, each gene has n design parameters, wherein the design parameters are incremental changes to the actual properties of the chromosome. A genetic algorithm is employed to optimize the genes until a fitness level for at least one chromosome has been exceeded. When the fitness value for any chromosome in the population is above a predetermined threshold, then the design process is terminated and the final design solution[s] are the design parameters of the chromosome[s] that exceed the predetermined threshold value.

30 Claims, 13 Drawing Sheets

OTHER PUBLICATIONS

Joo, Jinyong, and Kota, Sridhar (2004), "topological Synthesis of Compliant Mechanisms Using Nonlinear Beam Elements," Mechanics Based Design of Structures and machines, 32: 1, 17-38.

Frecker, M.I., G.K. Ananthasuresh, N. Nishiwaki, N. Kikuchi and S. Kota, "Topological synthesis of compliant mechanisms using multicriteria optimization," ASME J. Mech. Design, 119: 238-245, 1997.

M.L. Tsetlin, "Finite automata and models of simple forms of behavior," PhD Thesis, V.A. Steklov Mathematical Institute, 1964.

* cited by examiner

METHOD FOR THE DESIGN AND OPTIMIZATION OF MORPHING STRATEGIES FOR RECONFIGURABLE SURFACES

FIELD OF INVENTION

This invention relates to a method for the design and optimization of morphing strategies and, more particularly, to a method for the design and optimization of morphing strategies for reconfigurable surfaces consisting of variable-stiffness components, such that the morphing strategies instruct the user in the application of the available controls to a non-homogeneous structure (having the variable-stiffness components) such that the original structure shape changes to a final desired shape.

BACKGROUND OF INVENTION

The performance of many mechanical-structural systems, such as aircraft wings and antenna reflectors, is directly related to the geometric shapes of their components. Such systems would ideally prefer to adopt different shapes for different operating conditions, but they are generally designed to have one fixed shape that constitutes a compromise with respect to all the operating conditions. Research in reconfigurable surfaces aims to address this problem by providing ways to dynamically reconfigure the shape of the material surface in order to respond to varying operating conditions and external disturbances. This capability will enable systems such as aircrafts to maintain optimal performance and enhance versatility.

The most common approach to morph structures is based on compliant mechanisms. A compliant mechanism is a single piece of flexible structure that delivers the desired motion by undergoing elastic deformation as opposed to the rigid body motions in a conventional mechanism. These mechanisms are flexible enough to transmit motions, yet stiff enough to withstand external loads. The hinge-less nature of compliant mechanisms eliminates the backlash error and effectively reduces the production and maintenance costs associated with systems. Moreover, the distributed compliance throughout the compliant mechanism provides a smooth deformation field, which reduces the stress concentration.

Previous research on compliant mechanism synthesis has typically employed a two-step synthesis approach. The two-step approach decomposes the interrelated topology and dimensional syntheses into two separate stages: first, topology synthesis ensures the motion in the desired output direction and, second, the size and geometry optimization refines the mechanism dimensions to achieve a desired objective such as maximizing displacement. There are successful demonstrations of morphing structures based on the idea of compliant mechanisms.

One promising approach for creating large deformation morphing structures is based on using variable-stiffness components to provide large deformation without large energy input to the system. A variable-stiffness structure consists of constant stiffness material layers and variable modulus material layers arranged in alternating layers. The variable modulus material layers have a material with an elastic modulus that changes in response to an applied energy field. This allows reversible coupling and decoupling of stress transfer between successive layers of the constant stiffness material layers, providing a change in a bending stiffness of the variable-stiffness structure.

Variable-stiffness components create an ill-posed design problem and generally have multiple solutions for any given morphing task. Previous approaches to the solution of this complex problem related to the design of compliant mechanisms for morphing structural shapes. These approaches are inferior for the following two reasons.

First, the previous approaches are not well-suited for large deformation morphing tasks. This is because the amount of elastic energy consumed in morphing with large deformation using these compliant mechanisms is prohibitively large and makes it impractical to implement on real systems. In addition, these mechanisms cannot accomplish significant "Gaussian Curvature" or simultaneous curvature about two orthogonal axes because this requires a change in area in the plane of the deformation.

Second, the assumptions made in the previous methods are oversimplified. Some of these assumptions include the requirement that the shape-changing object will change from its initial profile to only one target profile and that the compliant mechanism has only a single external input actuator at a specified location. These assumptions are far too restrictive for any general-purpose morphing task.

Thus, a continuing need exists for a method that formulates the morphing problem as an optimization search, efficiently searches the design space and rapidly arrives at a family of plausible solutions. Such a method should be capable of operating on variable-stiffness components and thus offer solutions for more complex shapes, non-limiting examples of which include those shapes that can have large deformations, such as complete foldings. Such a method should also be completely unrestrictive with regard to any design constraints and thus offer a more powerful solution for design of morphing strategies that can realize complex target shapes using reconfigurable surfaces.

SUMMARY OF INVENTION

This invention relates to a method for the design and optimization of morphing strategies and, more particularly, to a method for the design and optimization of morphing strategies for reconfigurable surfaces consisting of variable-stiffness components.

Variable-stiffness components create an ill-posed design problem and generally have multiple solutions for any given morphing task. We formulate this problem as an optimization search using genetic algorithms (GA) to efficiently search the design space and rapidly arrive at a family of plausible solutions.

Thus the present invention comprises a method for optimizing the design of a shape morphing structure using a genetic algorithm. The method comprises acts of defining design parameters of a surface having variable properties into a chromosome. The variable properties of the chromosome are the actual properties of the chromosome, and the chromosome has a total of Nmax genes. Each gene corresponds to a variable property element in the surface and has n design parameters. Then, final desired properties of the surface having variable properties are defined. An initial population of chromosomes is defined, with each chromosome having genes with variations of the n design parameters that collectively define the variable properties of the entire surface. A fitness value is evaluated for each chromosome in the chromosome population by computing the difference between the final desired properties and the actual properties of each chromosome. The chromosome population is ranked based on their fitness values. A subset pair from the chromosome population is selected based on their ranks with higher ranked chromosomes being biased for selection over chromosomes with lower ranks. A cross-over point is randomly selected to perform a cross-over operation between chromosomes of the selected pair. A cross-over operation is performed between the selected pair; a portion of their genes are swapped to form a new pair of chromosomes. The acts of selecting a subset pair, randomly selecting a cross-over point, and performing the cross-over are repeated until a sufficient number of selected pairs of chromosomes have been crossed over to create enough chromosomes to equal the number of chromosomes in the initial chromosome population. Then the fitness of each chromosome in the chromosome population is evaluated by computing the difference between the final desired properties and the actual properties of each chromosome. If the fitness value for any chromosome in the population is above a predetermined threshold, then the design process is terminated and the final design solution[s] are the design parameters of the chromosome[s] that exceed the predetermined threshold value. If the fitness value for all chromosomes is below the predetermined threshold, then the acts of ranking, selecting, randomly selecting, performing, and repeating are repeated until the fitness for any chromosome in the population is above a predetermined threshold.

In yet another aspect, the method further comprises an act of performing a mutation operation, where a design parameter of a chromosome is randomly changed into a new value within an allowable range for the design parameter. The mutation operation is performed when a probability threshold is less than a predetermined value.

In yet another aspect, in the act of defining the design parameters of a surface, the surface is a surface selected from a group consisting of a variable-stiffness surface and a variable length surface.

In yet another aspect, in the act of defining the final desired properties, the final desired properties are shape attributes such that the method comprises an act of defining the final desired shape of the surface.

In yet another aspect, in the act of defining the design parameters, the design parameters are defined such that each gene has seven design parameters: gene selector, modulus of elasticity, actuator selector, length of the gene, axial force, bending force, and moment.

In yet another aspect, in the act of defining the design parameters, the parameters of the gene selector, modulus of elasticity, and actuator selector have binary values.

In yet another aspect, in the act of defining the design parameters, the parameters of the length of the gene, axial force, bending force, and moment have a range of real values.

In yet another aspect, wherein in the act of defining the design parameters, at least one of the design parameters has a binary value and at least one of the design parameters has a range of real values, such that the gene is a hybrid gene with both binary and real values.

In yet another aspect, wherein in the act of evaluating the fitness of each chromosome, the fitness value is measured as one over the mean square error between the desired and actual properties of the chromosome.

In yet another aspect, further comprising an act of selecting a design solution from the design solutions based on predetermined limitations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
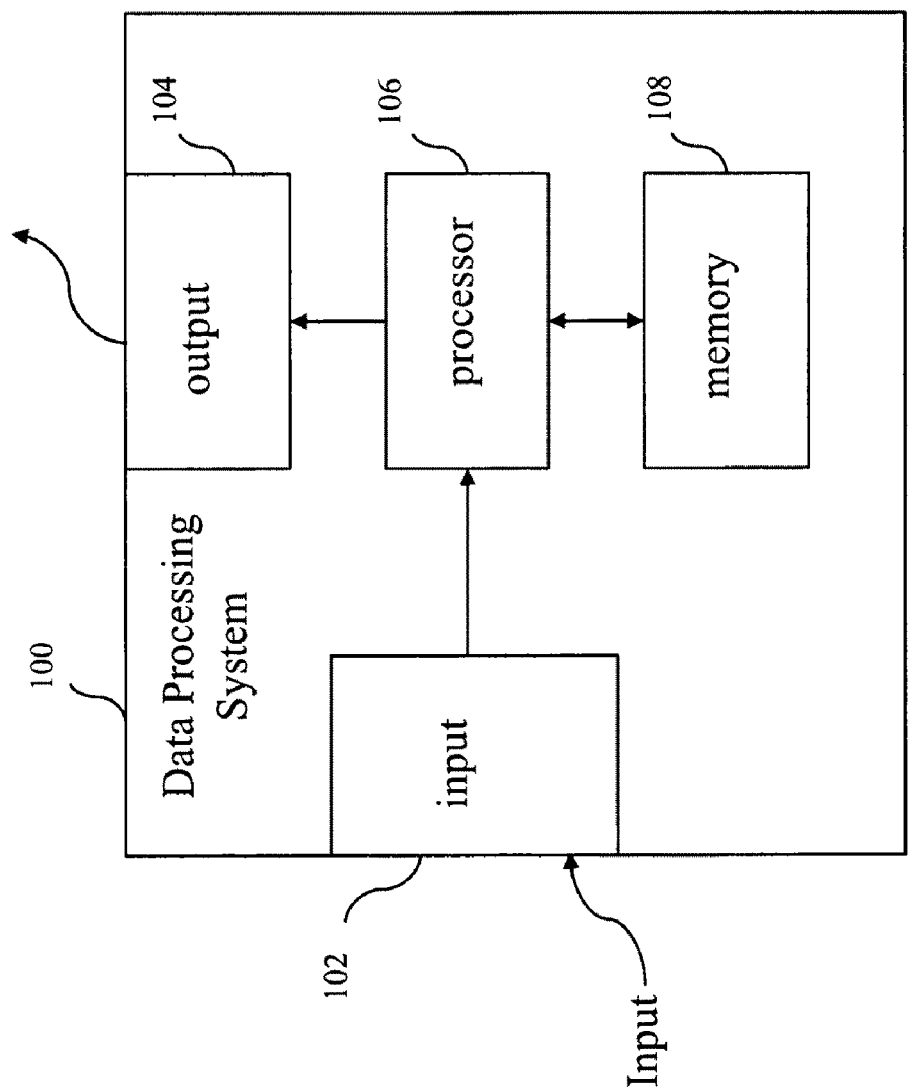
FIG. 1 is a block diagram depicting components of a system according to the present invention.

The present invention relates to a method for the design and optimization of morphing strategies. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, a description of various principal aspects of the present invention is provided. Subsequently, an introduction provides the reader with a general understanding of the present invention. Thereafter, details of the present invention are provided to give an understanding of the specific aspects. Finally, experimental results are provided as a non-limiting example to demonstrate the present invention.

(1) Principal Aspects

The present invention has three "principal" aspects. The first is a system for optimizing the design of a shape morphing structure. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of a system of the present invention is provided in FIG. 1. The system 100 comprises an input 102 for receiving information regarding the shape morphing structure, such as the parameters of the structure. Note that the input 102 may include multiple "ports."

An output 104 is connected with the processor for providing information (regarding the actions to be taken to optimize the design of the shape morphing structure) to other systems in order that a network of computer systems may serve as the optimization system. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
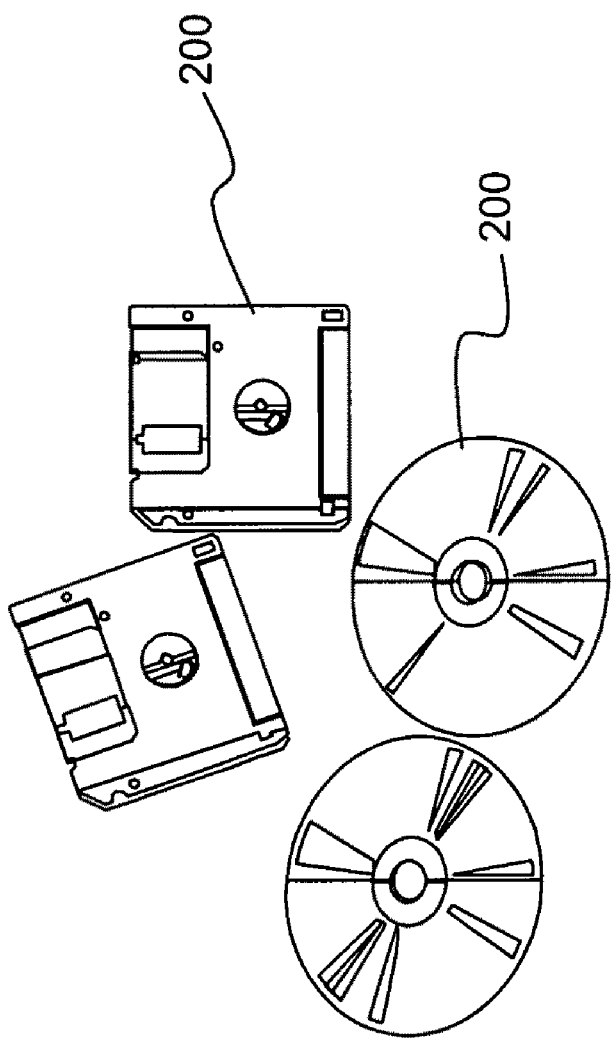
FIG. 2 is an illustration of a computer program product embodying the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instruction means stored on any compatible computer-readable medium. The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

(2) Introduction

The present invention is an automated approach to design shape morphing strategies for reconfigurable surfaces composed of variable stiffness components. Deforming structures composed of variable stiffness components is an ill-posed problem because there can be multiple solutions for any given morphing task. The present invention solves this problem by formulating it as an optimization search using distributed genetic algorithms (GA) to efficiently search the design space and rapidly arrive at a family of plausible solutions. The approach can simultaneously satisfy a broad range of design constraints, including structural properties, mechanical loading, boundary conditions, and shape. Computer simulations of the reconfigurable surface were performed using an accurate physics based model of the variable stiffness surface. The results of the simulations showed that the present invention not only verified the feasibility of morphing tasks of variable stiffness surfaces, but also enabled efficient exploration of much larger design spaces, resulting in unique and non-obvious morphing strategies.

(3) Details of the Invention

The present invention provides a method for finding the optimal realizable morphing strategy for a variable stiffness structure. The optimal realizable morphing strategy defines how to start with an initial curve or shape profile of a structure and due to input actuation, match a target curve or shape profile with minimum error There are inherent constraints that must accommodated be when developing a realizable morphing strategy for a variable stiffness structure into a target shape. These include the number of soft and stiff elements in the structure (i.e., stiffness of each beam element), the size and location of these elements, the number of actuators, the type of force (e.g. bending, stretching, tensile, shear) and their locations, the magnitude and range of forces and moments that can be applied, and other boundary conditions (such as cantilever, etc). The realizable morphing strategy is optimal in that the method of the present invention incorporates a cost function in developing the morphing strategy. An optimal realizable morphing strategy also can be used to devise an optimal configuration for the structure (consisting of variable stiffness components) such that the morphing task can be achieved. The optimal configuration can be used to verify the feasibility of achieving a target shape and thus provides a useful feasibility check before any control algorithm can be initiated to perform the morphing task. The term "beam" as used with respect to this invention refers to a mechanical structure capable of supporting loads.

(3.1) Genetic Algorithm

The present invention finds the optimal configuration as a search and optimization problem using genetic algorithms (GAs). GAs were described by Goldberg, D., in "*Genetic Algorithms in Search, Optimization, and Machine Learning,*" pp. 1-57, Addison Wesley, 1989, which is incorporated by reference as though fully set forth herein. GAs can be viewed as a search optimization tool that is inspired by natural principles of evolution to solve search problems. These tools are computationally simple and fast because of the parallel nature of the searches. It allows both binary and continuous variables to be searched and eliminates the ambiguity involved in some traditional approaches in filtering continuous variables.

The first step in performing the search is to encode the design parameters of the surface (e.g., beam/plate) into a chromosome. Thus, the design parameters of a surface are defined with respect to a chromosome. The surface has variable properties, with the variable properties of the chromosome being the actual properties of the chromosome. The chromosome has a total of Nmax genes, where each gene corresponds to a variable property element in the surface. Additionally, each gene has n design parameters. The design parameters are incremental changes to the actual properties of the chromosome.

The GA is designed to search for incremental changes to the parameters encoded by the chromosome. In this aspect, the modulus of elasticity, length of gene, axial force, bending force and moment parameters are encoded as incremental changes rather than absolute values. For example, the length of the beam may be increased or decreased during the evolution process by a small amount. This amount will be encoded into the gene of the chromosome. Thus, whenever a particular chromosome is deemed fit, the gene corresponding to the length will be instantiated on the beam such that the total beam length is either increased or decreased as provided by the length gene of the particular fit chromosome. The same idea can be applied to the other parameters of the chromosome such as modulus of elasticity, bending and axial forces and moments. This approach allows the GA to rapidly and smoothly control the deformations in the shape morphing structure.

In order to optimize the morphing strategies, a user must first define the final desired properties of the surface having variable properties. Once defined, a GA is employed to optimize the genes until a fitness level for at least one chromosome has been exceeded. When the fitness value for any chromosome in the population is above a predetermined threshold, then the design process is terminated and the final design solution[s] are the design parameters of the chromosome[s] that exceed the predetermined threshold value.

Figure 3:
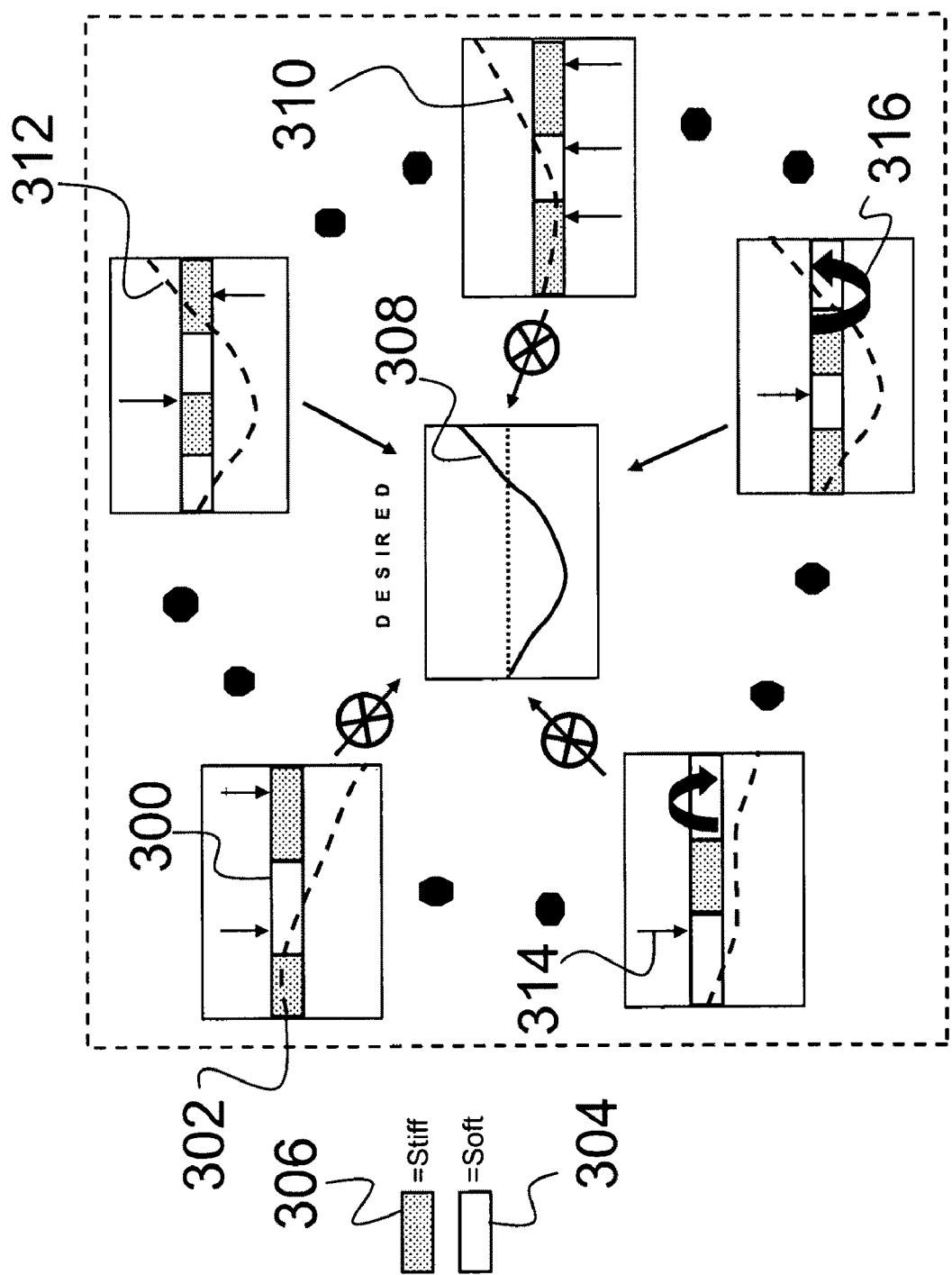
FIG. 3 is an illustration of an example of a design space for a cantilever beam with variable stiffness components.

An example of this procedure is illustrated in FIG. 3. FIG. 3 illustrates a design space for a surface 300 (i.e., cantilever beam) that is fixed at its left edge 302. As shown, the surface 300 includes variable properties (i.e., variable stiffness), such as soft 304 and stiff 306 elements. The target curve 308 is illustrated as the desired curve (having the final desired properties). The possible beam configurations are illustrated as dashed lines, where some of them result in incorrect shapes 310 while others are correct shapes 312 in that they result in shapes closer to the target curve 308. The straight arrows 314 represent the bending forces while the circular arrows 316 represent moments.

Figure 4:
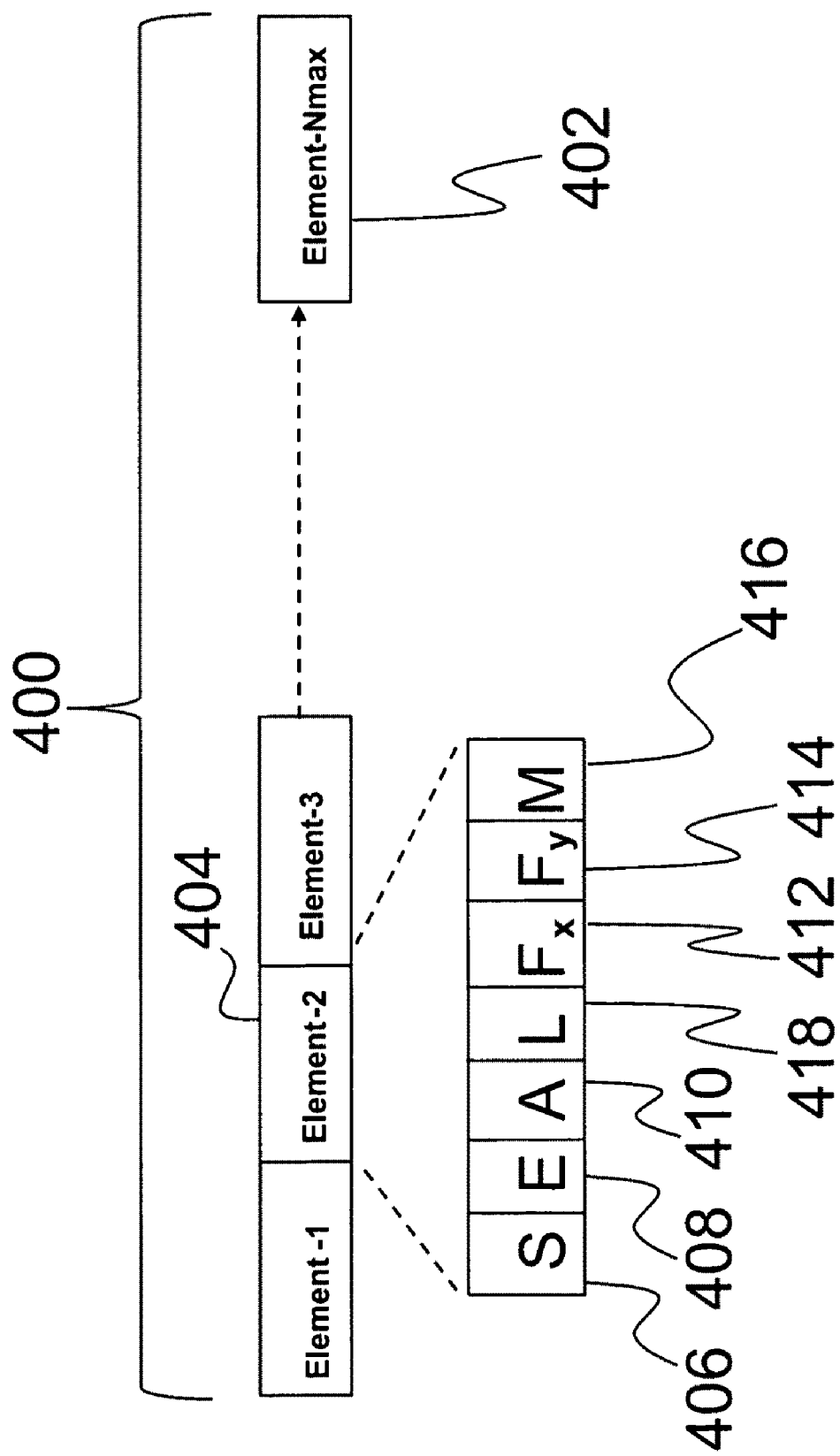
FIG. 4 is an illustration of an example chromosome for a beam.

FIG. 4 illustrates an example chromosome 400 for a beam. The chromosome 400 illustrated is hybrid in nature (i.e., consists of both binary and real values for its components) and contains a total of Nmax genes 402. Each individual gene 404 corresponds to a variable stiffness element in the beam. In this aspect, there are seven design parameters that are used for each gene 404. Each parameter of the gene 404 is referred to as an allele. The first allele is the selector S 406 (i.e., beam selector). This S allele 406 is binary and will select the variable stiffness element and its design parameters as part of the beam configuration if set to one. This formulation allows great flexibility during the search process to turn on/off various elements that may be beneficial/harmful to the morphing task. The second allele E 408 corresponds to the stiffness of the element (i.e., modulus of elasticity of each beam element). In this embodiment, the beam is assumed to be bi-compliant (i.e., it has two states for stiffness: soft (E=0) or stiff (E=1)). The third allele A 410 is used to activate (A=1) or deactivate (A=0) the actuator in that element (i.e., the actuator selector). The last three alleles (i.e., 412, 414, and 416, respectively) are analog or real and can be set to values based on the type of force being applied and the magnitude of the force. For example, if an actuator within an element is supposed to apply a bending force of 5 Newtons, then the $F_y$ 414 (i.e., the bending force) component is set to 5 and the remaining two components $F_x$ 412 (i.e., the axial force) and M 416 (i.e., the moment) are set to zero. In other aspects, the E allele 408 can be set to take on real values as well, thereby allowing for a variety of states for the stiffness of the beam elements.

Finally, the L allele 418 refers to the length component of the beam (i.e., the length of beam element). Thus, the chromosome formulation can be looked upon as a variable length encoding scheme wherein beams of variable lengths can be created. While the S allele 406, E allele 408, and the A allele 410 are binary values, the remaining alleles have floating point values. This scheme allows for the efficient exploration of much larger design spaces, which results in unique and non-obvious morphing strategies.

Therefore, although variations are possible as can be appreciated by one skilled in the art, the design parameters are defined such that each gene has the seven design parameters of gene selector, modulus of elasticity, actuator selector, length of the gene, axial force, bending force, and moment.

(3.2) Material Model

Figure 5:
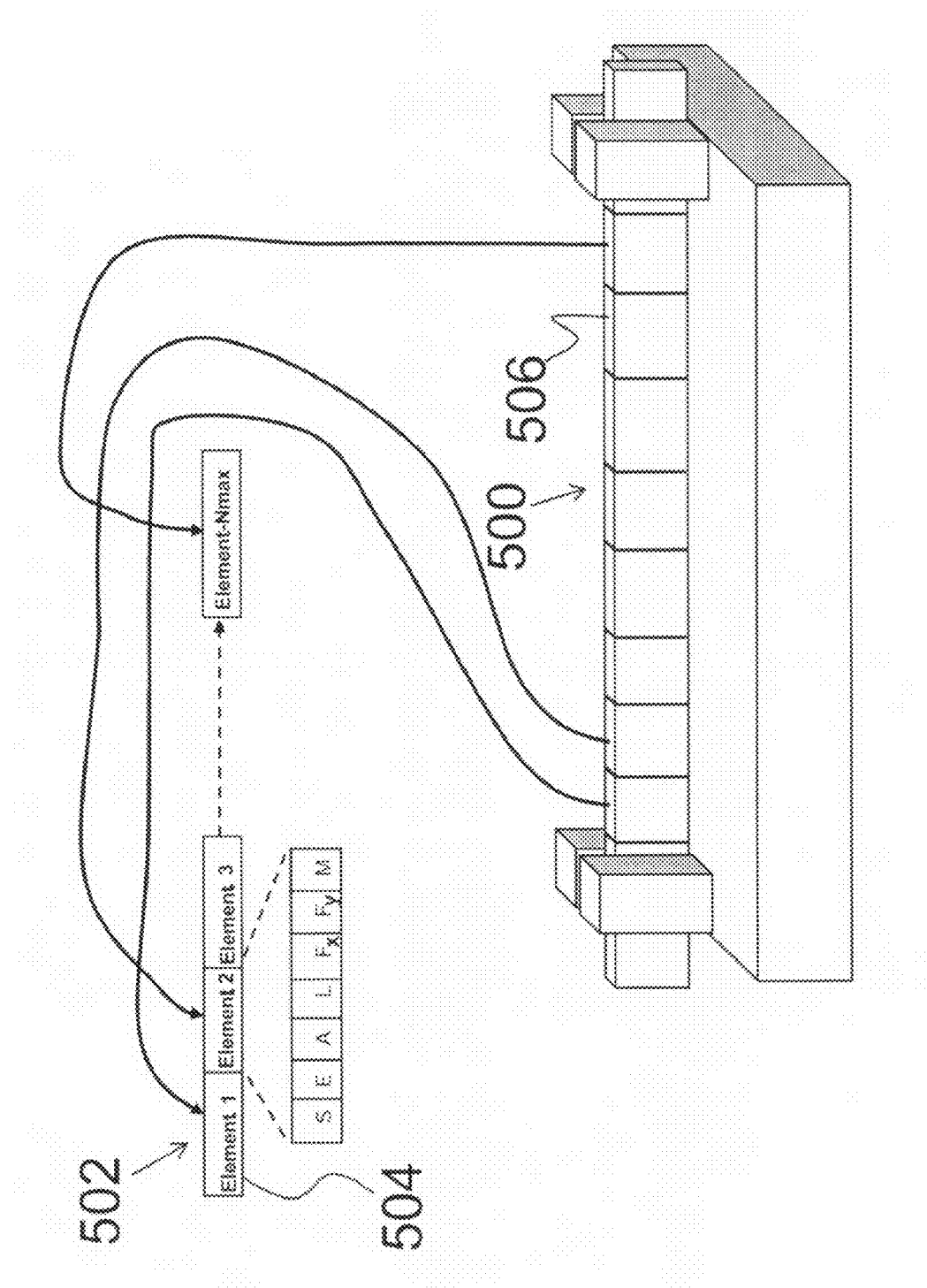
FIG. 5 is an illustration of design parameters of the beam, being encoded using a hybrid chromosome.

FIG. 5 is an illustration of the design parameters of a beam 500 being encoded using a hybrid chromosome 502. As shown, each individual gene 504 corresponds to a variable stiffness element 506 in the beam 500.

In order to have an accurate search by the GA algorithm, a computationally efficient variable stiffness surface model was developed. Computer simulations of the reconfigurable, variable stiffness surface (i.e., beam 500) are performed using a physics-based model of the variable stiffness surface. As a non-limiting example, the surface is modeled as a thin elastic sheet (membrane) in which the stretching and bending elastic moduli are treated separately and as arbitrary functions defined over the surface.

The numerical representation of the surface follows the materials point method in which a grid of points, representing the nodes of a regular coordinate system internal to the surface, are considered in the real three-dimensional embedding space. The materials point method was described by York, A. R., Sulsky, D., and Schreyer, H. L., in "The Material Point Method for Simulation of Thin Membranes," *Int. J. Numer. Meth. Eng*, 44, 1429-1456, 1999, which is incorporated by reference as though fully set forth herein.

Figure 6:
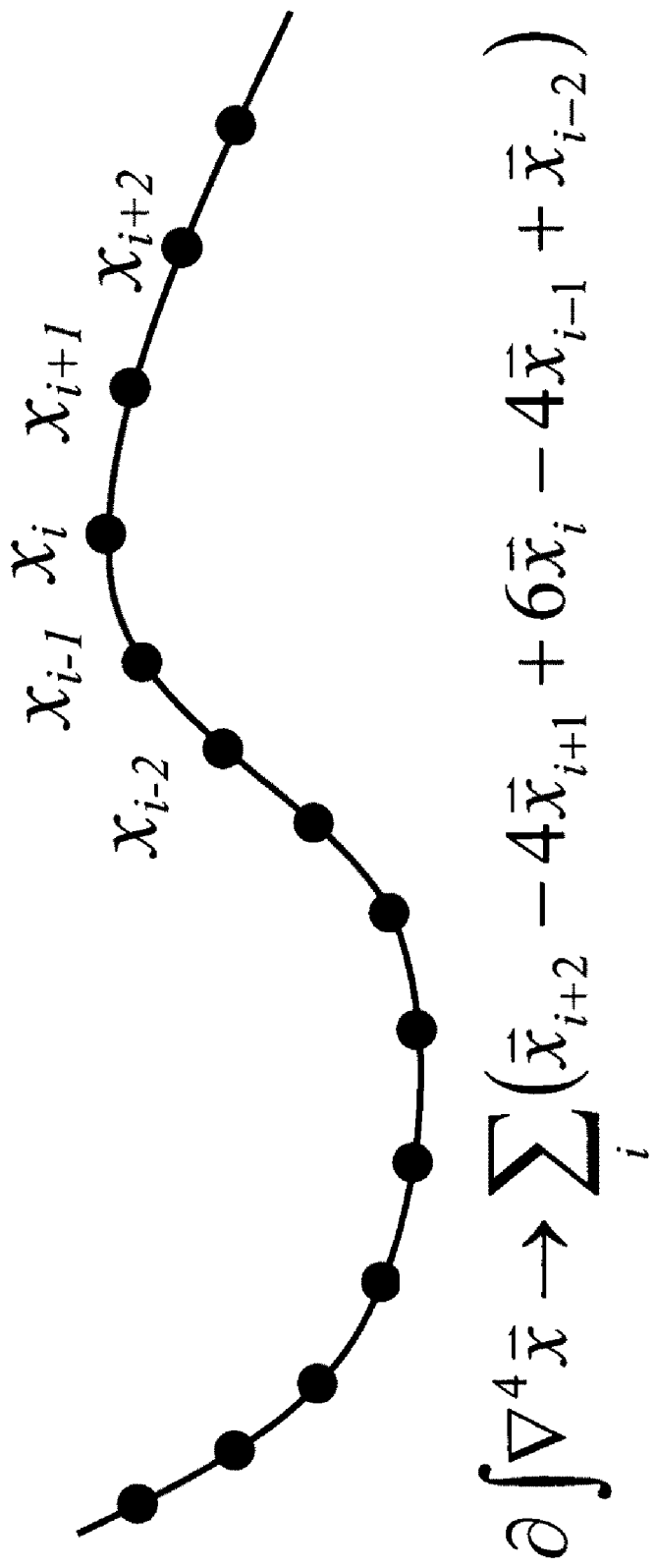
FIG. 6 is a schematic of a finite-difference scheme used in a material model.

This parameterization allows for arbitrarily large deformations of the surface including complete foldings and is a unique feature of this model. The non-linear elastic equations of state are discretized naturally in this parameterization using a finite-difference method, as illustrated in FIG. 6. FIG. 6 is a schematic of a finite-difference scheme used in the material model. Partial derivatives and non-local potential terms can be constructed algebraically and exactly to the order desired. This results in a system of non-linear algebraic equations in which the surface conformation itself is among the set of dependent variables. Essentially, the finite differences in the material point method are simple algebraic relations among vectors.

The solution of these equations is carried out using various preconditioned global search based relaxation algorithms. Generally, elasticity problems of this sort tend to be fairly stiff. However, in this case, the dominant shape is determined by the bending elasticity terms which have, as their lowest order components, the elements of a bi-harmonic equation. The bi-harmonic term can be separated out and used to pre-condition the remainder of the equation resulting in a significant smoothing of the numerical system and promoting rapid convergence in most iterative non-linear solution schemes. The particular non-linear solver used is a version of 'min-pack,' which is based on the dog-leg non-local search scheme. 'Minipack' can be found at the Netlib repository, located at http://www.netlib.org, taken on Jul. 30, 2007. In addition to preconditioning with the inverted bi-harmonic operator, various strategies can also be employed, specific to particular boundary conditions, in which both the applied forces and variable bending moduli are progressively modified from nominal to final values. At each step a complete elastic relaxation is performed, hence tracing out a quasi-static pathway from various known or easily computed conformations to any arbitrary final conformation.

(3.3) GA Search Procedure

Figure 7:
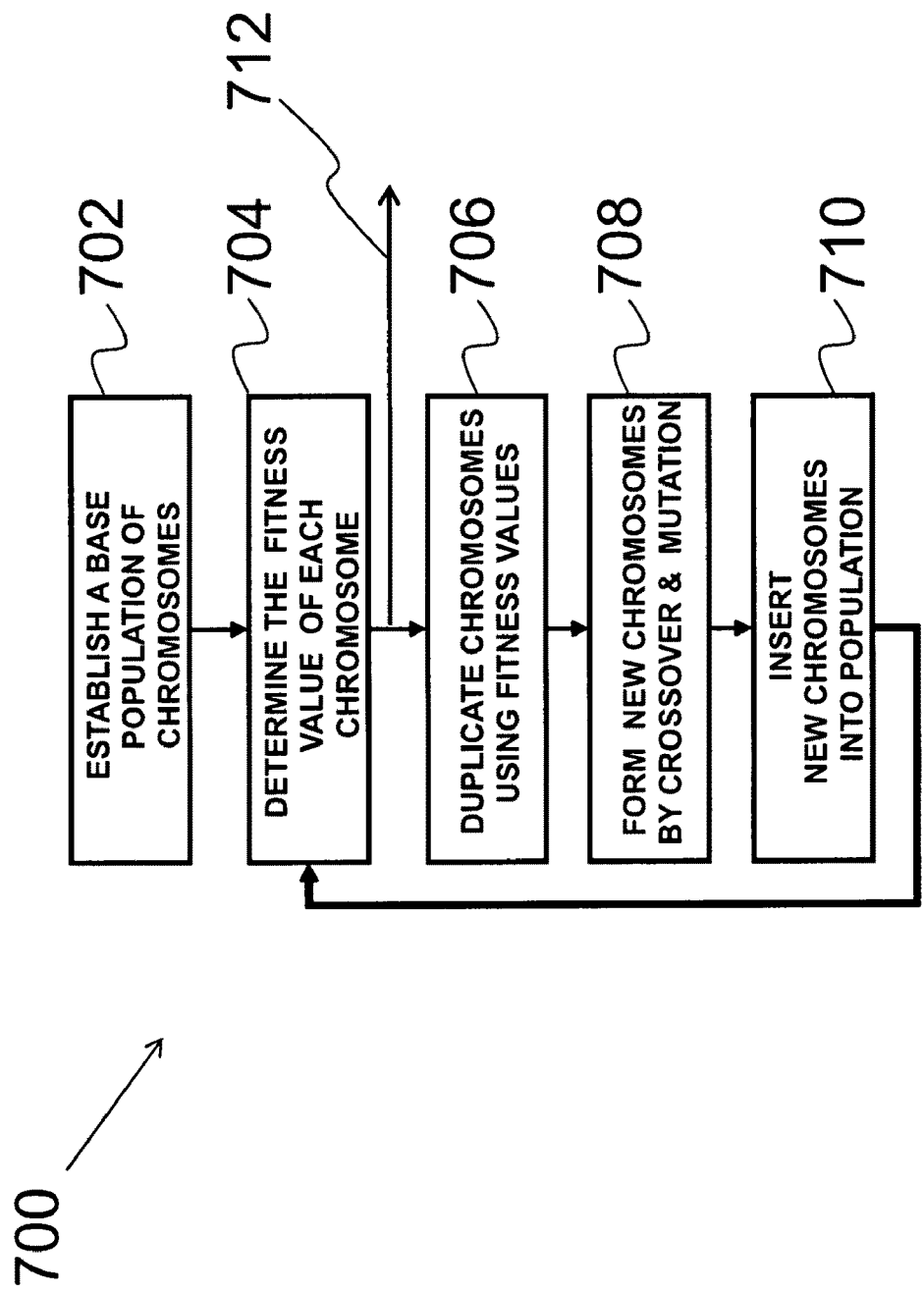
FIG. 7 is a schematic of various steps in a genetic algorithm.

The GA search procedure begins with an initial population of chromosomes whose genes are randomly initialized based on the allowable range of values for each allele. Each chromosome corresponds to a candidate beam configuration within the design space (refer to FIG. 3). The various steps in the GA search procedure 700 are outlined in FIG. 7. As shown, a base population of chromosomes is established 702. Thereafter, the fitness value of each chromosome is determined 704. Next, the chromosomes are duplicated using the fitness values 706. New chromosomes are then formed using crossover and mutations 708. Next, the new chromosomes are the inserted into the population 710. As illustrated, this procedure can be performed recursively. The procedure is repeated until the fitness value for any chromosome in the population is above a predetermined threshold. Once the fitness value for any chromosome in the population exceeds the threshold, the design process is terminated and the final design solution is provided 712 to a user for use in designing the shape morphing structure.

The final design solution[s] are the design parameters of the chromosome[s] that exceed the predetermined threshold value. The design parameters provide a blueprint (or manufacturing instructions) for optimizing the process to construct a reconfigurable surface having predetermined desired properties. Thus, the surface is formed according to the design parameters.

Figure 8:
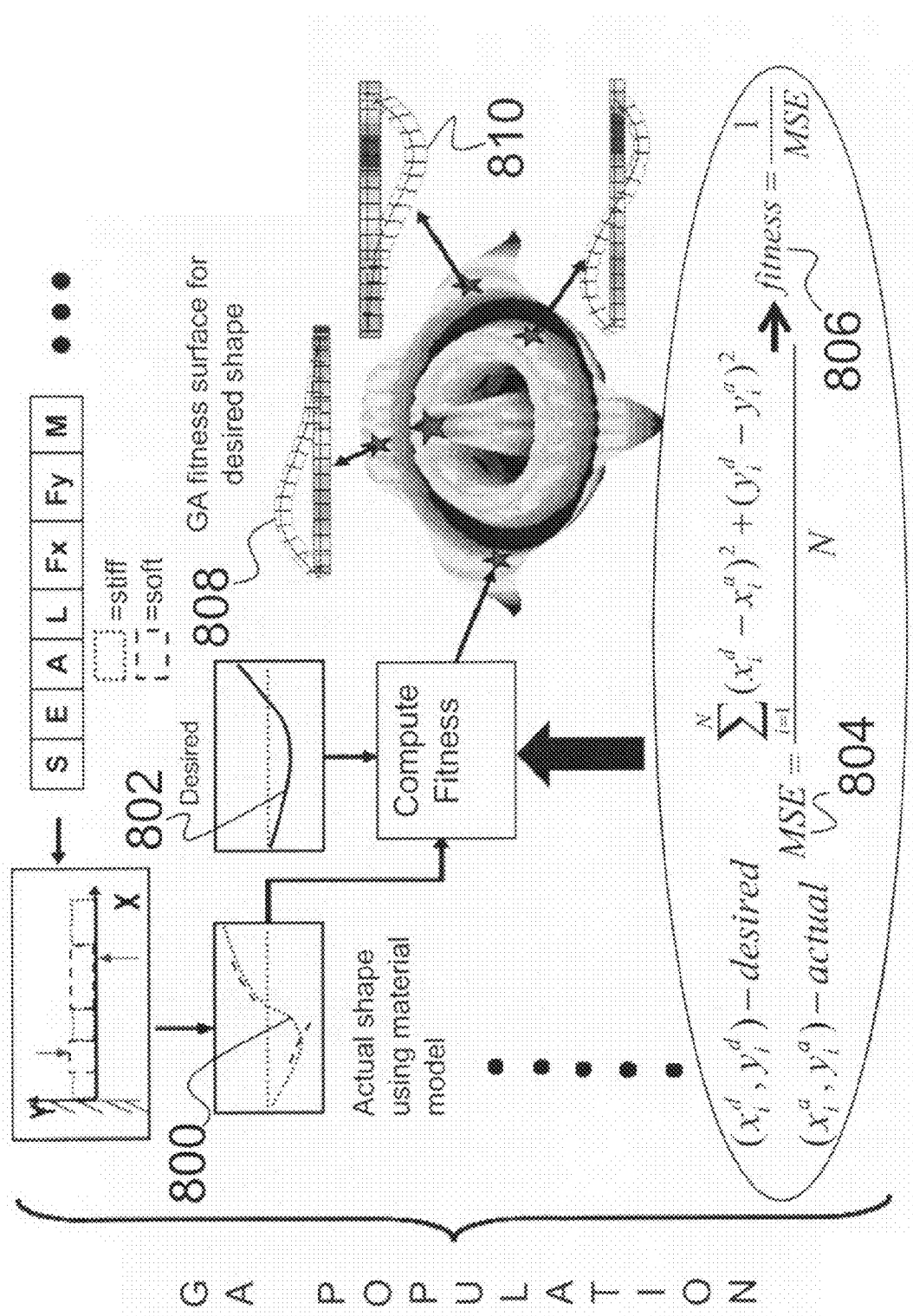
FIG. 8 is a schematic of the steps in the computation of the fitness measure.

Given a beam configuration, the deformed shape of the beam can be computed using the material model (as described above) for each member of the population. As shown in FIG. 8, the deformed shape/curve 800 of each member is then compared to the target shape/curve 802. In this aspect, the comparison can be performed using any suitable technique, a non-limiting example of which includes using a normalized Euclidean distance (MSE) 804 between the deformed curve and the target curve (as shown in FIG. 8). The fitness 806 of the member is set to be 1.0/MSE. If there was a perfect solution, then the MSE 804 will be zero and the fitness 806 of that particular member will be infinite. The GA compares the members of the population and performs a ranking of the members in terms of their fitness. Then, a subset of these members is selected for mating to create a new population.

The selection method based on roulette wheel sampling is employed in this aspect where the members with higher fitness have a higher probability of being selected for mating. Roulette wheel sampling was described by Goldberg, D., in Genetic *Algorithms in Search, Optimization, and Machine Learning*, pp. 1-57, Addison Wesley, 1989, which is incorporated by reference as though fully set forth herein.

The fitness of various members of the population can be viewed as the points on a fitness landscape that may contain several peaks 808 (local maxima) and valleys 810 (local minima). The goal of the GA is to find solutions that are close or at the optimal location (the global maxima or minima as the case may be). Typically, the GA search procedure is terminated when the actual shape of the material is within a tolerance limit (above a predetermined threshold) of the target shape.

Figure 9:
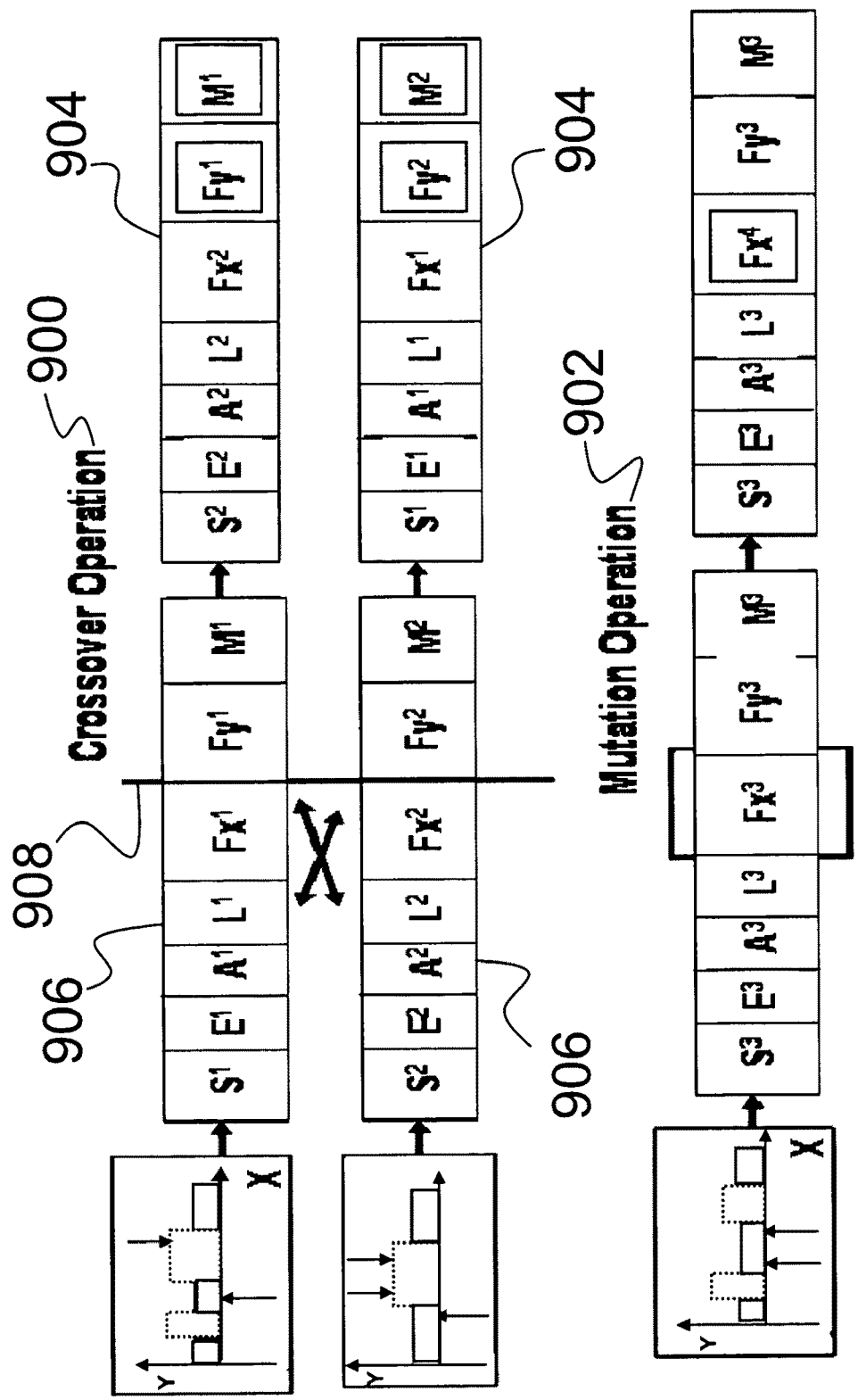
FIG. 9 is a schematic of an example for crossover and mutation during a GA search to find a feasible design solution.

Once this selection is made, two critical operations follow called the cross-over and mutation. FIG. 9 illustrates an example of the crossover 900 and mutation 902 operations during the GA search to find a feasible design solution. Cross-over 900 and mutation 902 are two basic operators of GA, which depends upon them to enhance the GAs performance. The type and implementation of operators depends on the encoding and also on the problem. Crossover 900 is mainly responsible for the introduction of new genetic material into an existing member of the population, allowing offsprings 904 (the new beam configurations) to share some features from both parents 906 (beams chosen for mating). In this aspect, a single point 908 crossover 900 method is used in which after a random selection of the parental pair, offsprings 904 are produced by parents 906 exchanging the "head" and "tail" genetic material determined by the randomly selected crossover point 908. It should be noted that the present invention is not limited to a single crossover point as there can be multiple crossover points.

Furthermore, a probability of crossover per population is introduced called crossover rate (set to 0.7 in experiments conducted with respect to the present invention), giving the opportunity for some parents to pass the whole of their genetic material to the offspring by simple duplication. The standard mutation operator performs random alteration of the allele's value. Here again, a choice of specifying the mutation probability per population and per gene size can be set using the mutation rate (set to 0.3 in experiments conducted with respect to the present invention).

(4) Experimental Results

Using the GA, experiments were performed to obtain design solutions for morphing tasks for a beam. Although demonstrated with respect to a beam, the present invention is not intended to be limited thereto and is extensible to any suitable platform, a non-limiting example of which includes a plate.

Figure 10:
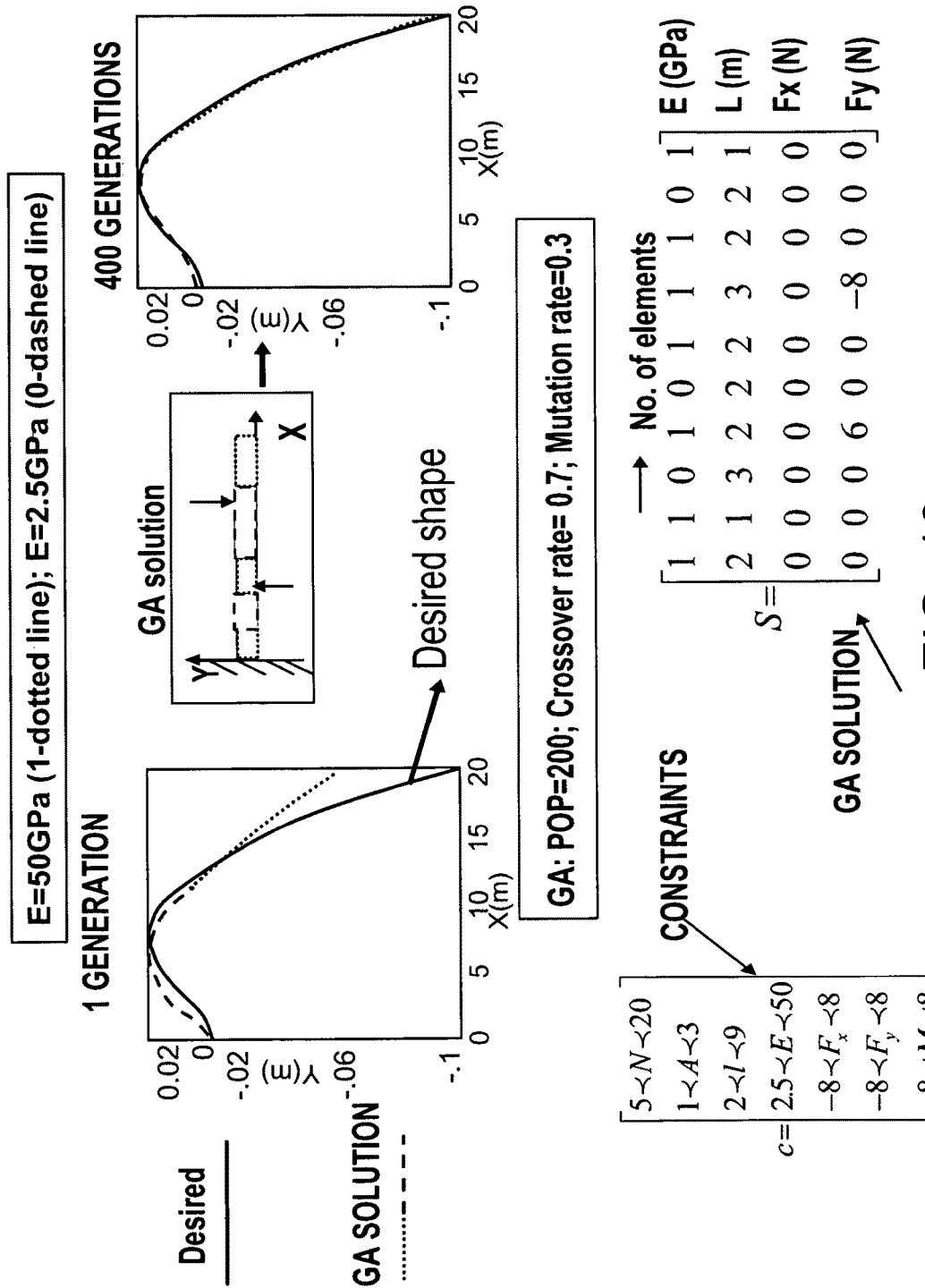
FIG. 10 is an illustration of an example solution for a morphing task as obtained by the present invention.

In this experiment, all the simulation results are shown for a bi-compliant beam problem. The approach was tested for two different morphing tasks for a cantilever beam. Each morphing task was initiated from a flat (no load) condition. This however, is not strictly required to obtain useful solutions. All simulations used the material model described earlier and consist of a population size of 200. The results of the simulations for the first morphing task are shown in FIG. 10. The design constraints are listed and the final solution is summarized in the form of matrix S. The final shape of the beam is also shown after 400 generations.

Figure 11:
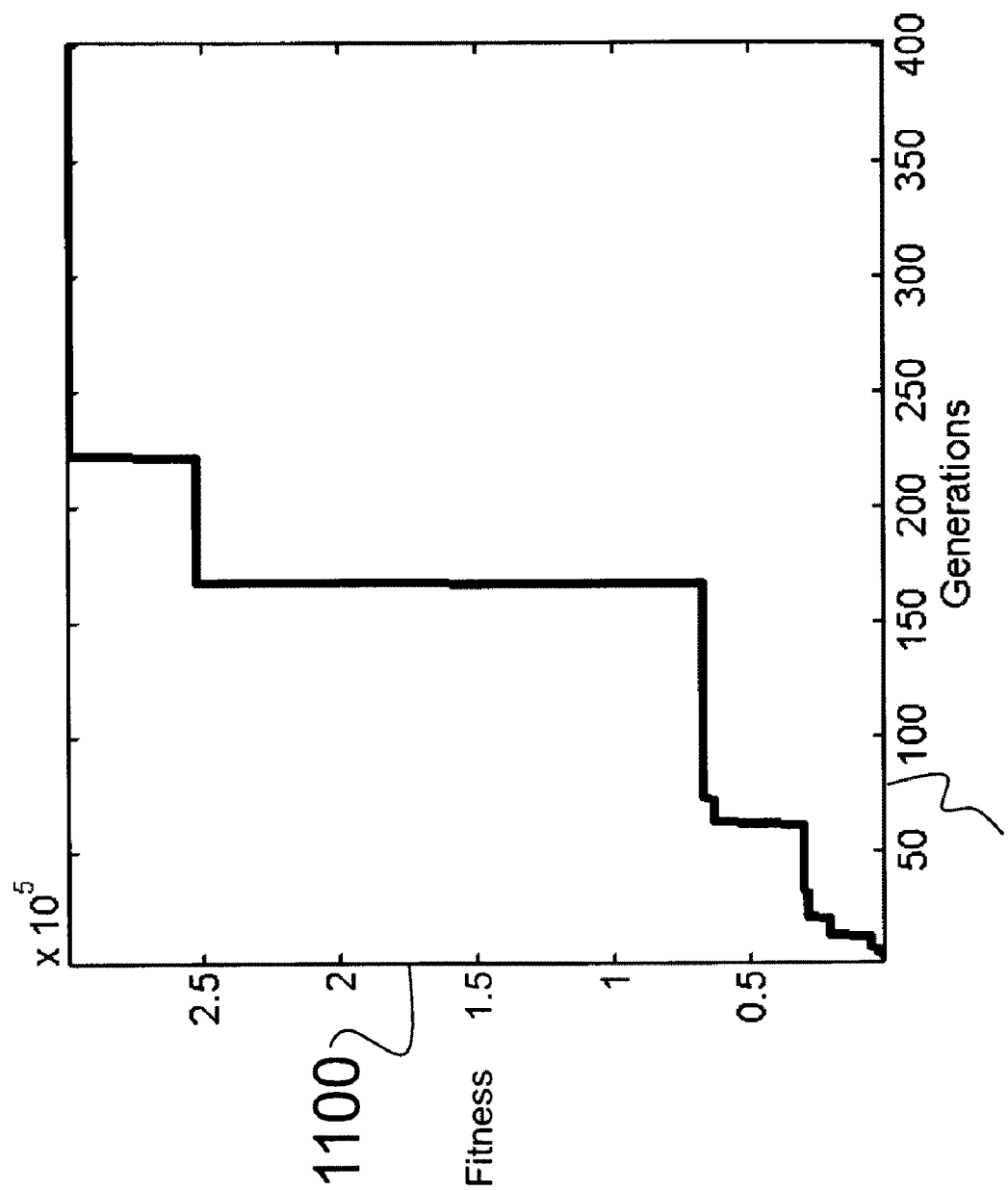
FIG. 11 is a graph showing an example of the fitness convergence for the morphing task whose schematic is shown in FIG. 10.
Figure 12:
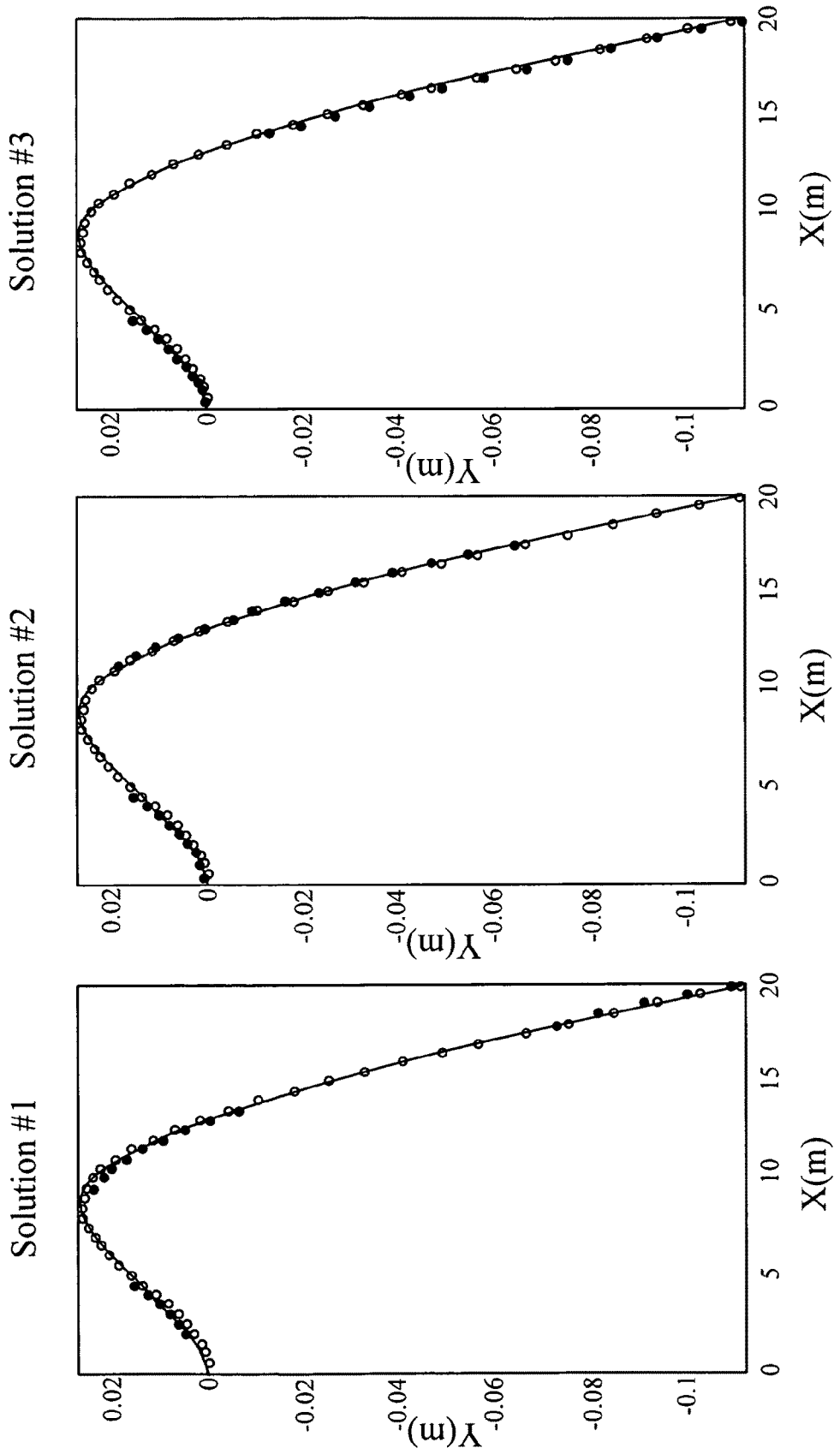
FIG. 12 is an illustration of three graphs, each graph showing a plausible solution obtained for a morphing task.

The fitness convergence for the problem outlined in FIG. 10 is shown in FIG. 11. It can be seen that the fitness 1100 improves rapidly with generations 1102. The plateau in the fitness curves represent stages were the algorithm is attempting to get out of a local minima. It can be seen that the GA does find very good solutions to the morphing task. In fact, the GA arrives at three plausible solutions to the first morphing task, as shown in FIG. 12. Notice that the stiffness profiles for the three beams are different. However, the actuation profiles were the same for all three cases.

Figure 13:
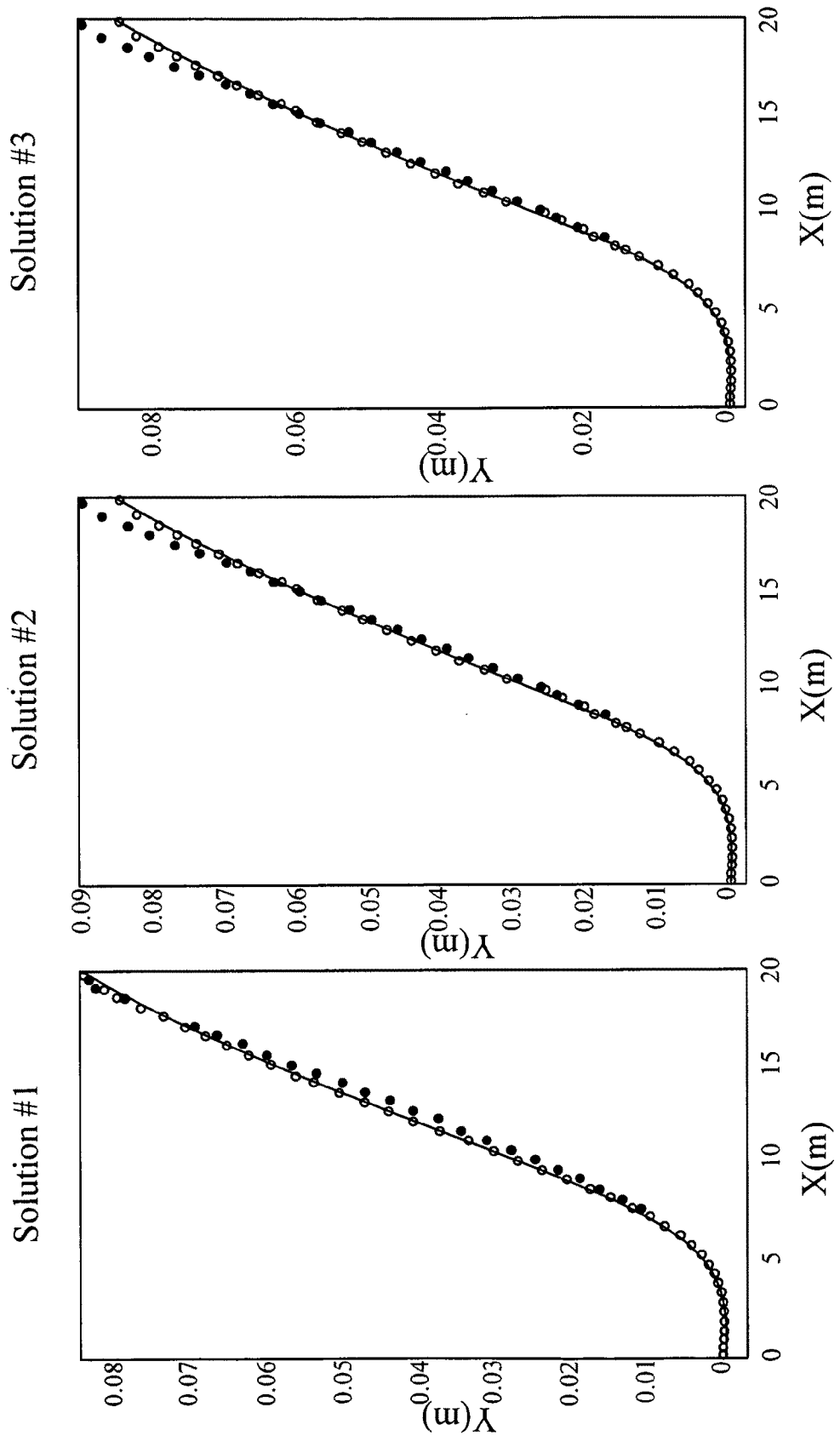
FIG. 13 is an illustration of three graphs, each graph showing a plausible solution obtained for a morphing task.

As shown in FIG. 13, a similar set of three plausible solutions were obtained for the second morphing task. Once again, the stiffness profiles for the three beams are different. These results suggest that the invention is capable of providing useful solutions to the problem of morphing a variable stiffness material. While all the results were limited to bi-compliant beams for ease of illustration, this approach is readily extensible to the case of a variable stiffness material beam with many intermediate stiffness components. Since the approach does not make any assumptions, the present invention is far more general and versatile and can offer solutions to a lot more complex morphing tasks. This tool, combined with the concept of using variable stiffness material for the beams/plates offers an exciting and a powerful approach to realize truly general shape morphing capabilities for various applications.

What is claimed is:

1. A computer implemented method for optimizing the design of a shape morphing structure using a genetic algorithm, comprising an act of:
   causing a processor to execute instructions encoded on a memory, such that upon execution, the processor performs operations of:
   defining design parameters of a surface having variable properties into a chromosome, the variable properties of the chromosome being the actual properties of the chromosome, and where the chromosome has a total of Nmax genes, where each gene corresponds to a variable property element in the surface, and where each gene has n design parameters, wherein the design parameters are incremental changes to the actual properties of the chromosome, wherein in defining the design parameters, at least one of the design parameters has a binary value and at least one of the design parameters has a range of real values, such that the gene is a hybrid gene with both binary and real values;
   defining final desired properties of the surface having variable properties;
   employing a genetic algorithm to optimize the genes until a fitness level for at least one chromosome has been exceeded, and when the fitness value for any chromosome in the population is above a predetermined threshold, then the design process is terminated and a final design solution[s] are the design parameters of the chromosome[s] that exceed the predetermined threshold value;
   providing the final design solution[s] to a user for use in designing the shape morphing structure; and
   wherein in the act of defining the design parameters of a surface, the surface is a surface selected from a group consisting of a variable-stiffness surface and a variable length surface.

2. A method as set forth in claim 1, wherein in the act of defining the design parameters, the design parameters are defined such that each gene has seven design parameters, the design parameters being:
   gene selector;
   modulus of elasticity;
   actuator selector;
   length of the gene;
   axial force;
   bending force; and
   moment.

3. A method as set forth in claim 2, wherein the incremental changes are the changes to at least one of the gene selector; the modulus of elasticity; the actuator selector; the length of the gene; the axial force; the bending force; and the moment, the incremental changes resulting in an intermediate set of designs upon which a best fit is selected which best fits the final design, and where the best fit is incrementally changed to create a new set of intermediate designs until the best fit is the final design.

4. A method as set forth in claim 2, wherein in the act of defining the design parameters, the parameters of the gene selector, modulus of elasticity, and actuator selector have binary values.

5. A method as set forth in claim 2, wherein in the act of defining the design parameters, the parameters of the length of the gene, axial force, bending force, and moment have a range of real values.

6. A method as set forth in claim 1, wherein the act of employing a genetic algorithm to optimize the genes further comprises acts of:
   creating an initial population of chromosomes, with each chromosome having genes with variations of the n design parameters that collectively define the variable properties of the entire surface;
   evaluating a fitness value for each chromosome in the chromosome population by computing the difference between the final desired properties and the actual properties of each chromosome;
   ranking the chromosome population based on their fitness values;
   selecting a subset pair from the chromosome population based on their ranks with higher ranked chromosomes being biased for selection over chromosomes with lower ranks;
   randomly selecting a cross-over point to perform a cross-over operation between chromosomes of the selected pair;
   performing a cross-over operation between the selected pair, where a portion of their genes are swapped to form a new pair of chromosomes;
   repeating the acts of selecting a subset pair, randomly selecting a cross-over point, and performing the cross-over until a sufficient number of selected pairs of chromosomes have been crossed over to equal the number of chromosomes in the initial chromosome population; and
   evaluating the fitness of each chromosome in the chromosome population by computing the difference between the final desired properties and the actual properties of each chromosome, if the fitness value for any chromosome in the population is above a predetermined threshold, then the design process is terminated and the final design solution[s] are the design parameters of the chromosome[s] that exceed the predetermined threshold value, and if the fitness value for all chromosomes is below the predetermined threshold, then repeating the acts of ranking, selecting, randomly selecting, performing, and repeating until the fitness for any chromosome in the population is above a predetermined threshold.

7. A method as set forth in claim 1, further comprising an act of performing a mutation operation where a design parameter of a chromosome is randomly changed into a new value within an allowable range for the design parameter, the mutation operation being performed when a probability threshold is less than a predetermined value.

8. A method as set forth in claim 1, wherein in the act of defining the final desired properties, the final desired properties are shape attributes such that the method comprises an act of defining the final desired shape of the surface.

9. A method as set forth in claim 1, wherein in the act of evaluating the fitness of each chromosome, the fitness value is measured as one over a mean square error between the desired and actual properties of the chromosome.

10. A method as set forth in claim 1, further comprising an act of selecting a design solution from the design solutions based on predetermined limitations.

11. A system for optimizing the design of a shape morphing structure using a genetic algorithm, the system comprising one or more processors configured to perform operations of:
   defining design parameters of a surface having variable properties into a chromosome, the variable properties of the chromosome being the actual properties of the chromosome, and where the chromosome has a total of Nmax genes, where each gene corresponds to a variable property element in the surface, and where each gene has n design parameters, wherein the design parameters are incremental changes to the actual properties of the chromosome, wherein in defining the design parameters, at least one of the design parameters has a binary value and at least one of the design parameters has a range of real values, such that the gene is a hybrid gene with both binary and real values;

defining final desired properties of the surface having variable properties;

employing a genetic algorithm to optimize the genes until a fitness level for at least one chromosome has been exceeded, and when the fitness value for any chromosome in the population is above a predetermined threshold, then the design process is terminated and the final design solution[s] are the design parameters of the chromosome[s] that exceed the predetermined threshold value;

providing the final design solution[s] to a user for use in designing the shape morphing structure; and wherein in defining the design parameters of a surface, the surface is a surface selected from a group consisting of a variable-stiffness surface and a variable length surface.

12. A system as set forth in claim 11, wherein in defining the design parameters, the design parameters are defined such that each gene has seven design parameters, the design parameters being:
  gene selector;
  modulus of elasticity;
  actuator selector;
  length of the gene;
  axial force;
  bending force; and
  moment.

13. A system as set forth in claim 12, wherein the incremental changes are the changes to at least one of the gene selector; the modulus of elasticity; the actuator selector; the length of the gene; the axial force; the bending force; and the moment, the incremental changes resulting in an intermediate set of designs upon which a best fit is selected which best fits the final design, and where the best fit is incrementally changed to create a new set of intermediate designs until the best fit is the final design.

14. A system as set forth in claim 12, wherein in defining the design parameters, the parameters of the gene selector, modulus of elasticity, and actuator selector have binary values.

15. A system as set forth in claim 12, wherein in defining the design parameters, the parameters of the length of the gene, axial force, bending force, and moment have a range of real values.

16. A system as set forth in claim 11, wherein in employing a genetic algorithm to optimize the genes, the system is further configured to perform operations of:
  creating an initial population of chromosomes, with each chromosome having genes with variations of the n design parameters that collectively define the variable properties of the entire surface;
  evaluating a fitness value for each chromosome in the chromosome population by computing the difference between the final desired properties and the actual properties of each chromosome;
  ranking the chromosome population based on their fitness values;
  selecting a subset pair from the chromosome population based on their ranks with higher ranked chromosomes being biased for selection over chromosomes with lower ranks;
  randomly selecting a cross-over point to perform a cross-over operation between chromosomes of the selected pair;
  performing a cross-over operation between the selected pair, where a portion of their genes are swapped to form a new pair of chromosomes;
  repeating the acts of selecting a subset pair, randomly selecting a cross-over point, and performing the cross-over until a sufficient number of selected pairs of chromosomes have been crossed over to equal the number of chromosomes in the initial chromosome population; and
  evaluating the fitness of each chromosome in the chromosome population by computing the difference between the final desired properties and the actual properties of each chromosome, if the fitness value for any chromosome in the population is above a predetermined threshold, then the design process is terminated and the final design solution[s] are the design parameters of the chromosome[s] that exceed the predetermined threshold value, and if the fitness value for all chromosomes is below the predetermined threshold, then repeating the acts of ranking, selecting, randomly selecting, performing, and repeating until the fitness for any chromosome in the population is above a predetermined threshold.

17. A system as set forth in claim 11, wherein the system is further configured to perform a mutation operation where a design parameter of a chromosome is randomly changed into a new value within an allowable range for the design parameter, the mutation operation being performed when a probability threshold is less than a predetermined value.

18. A system as set forth in claim 11, wherein in defining the final desired properties, the final desired properties are shape attributes such that the method comprises an act of defining the final desired shape of the surface.

19. A system as set forth in claim 11, wherein in evaluating the fitness of each chromosome, the fitness value is measured as one over a mean square error between the desired and actual properties of the chromosome.

20. A system as set forth in claim 11, wherein the system is further configured to perform an operation of selecting a design solution from the design solutions based on predetermined limitations.

21. A computer program product for optimizing a morphing strategy for reconfigurable surfaces, the computer program product comprising computer-readable instruction means encoded on a computer-readable medium that are executable by a computer for causing the computer to perform operations of:
  defining design parameters of a surface having variable properties into a chromosome, the variable properties of the chromosome being the actual properties of the chromosome, and where the chromosome has a total of Nmax genes, where each gene corresponds to a variable property element in the surface, and where each gene has n design parameters, wherein the design parameters are incremental changes to the actual properties of the chromosome, wherein in defining the design parameters, at least one of the design parameters has a binary value and at least one of the design parameters has a range of real values, such that the gene is a hybrid gene with both binary and real values;
  defining final desired properties of the surface having variable properties;

employing a genetic algorithm to optimize the genes until a fitness level for at least one chromosome has been exceeded, and when the fitness value for any chromosome in the population is above a predetermined threshold, then the design process is terminated and the final design solution[s] are the design parameters of the chromosome[s] that exceed the predetermined threshold value;

providing the final design solution[s] to a user for use in designing the shape morphing structure; and wherein in defining the design parameters of a surface, the surface is a surface selected from a group consisting of a variable-stiffness surface and a variable length surface.

22. A computer program product as set forth in claim 21, wherein in defining the design parameters, the design parameters are defined such that each gene has seven design parameters, the design parameters being:

gene selector;
modulus of elasticity;
actuator selector;
length of the gene;
axial force;
bending force; and
moment.

23. A computer program product as set forth in claim 22, wherein the incremental changes are the changes to at least one of the gene selector; the modulus of elasticity; the actuator selector; the length of the gene; the axial force; the bending force; and the moment, the incremental changes resulting in an intermediate set of designs upon which a best fit is selected which best fits the final design, and where the best fit is incrementally changed to create a new set of intermediate designs until the best fit is the final design.

24. A computer program product as set forth in claim 22, wherein in defining the design parameters, the parameters of the gene selector, modulus of elasticity, and actuator selector have binary values.

25. A computer program product as set forth in claim 22, wherein in defining the design parameters, the parameters of the length of the gene, axial force, bending force, and moment have a range of real values.

26. A computer program product as set forth in claim 21, wherein in employing a genetic algorithm to optimize the genes, the computer program product further comprises instruction means for causing a computer to perform operations of:

creating an initial population of chromosomes, with each chromosome having genes with variations of the n design parameters that collectively define the variable properties of the entire surface;

evaluating a fitness value for each chromosome in the chromosome population by computing the difference between the final desired properties and the actual properties of each chromosome;

ranking the chromosome population based on their fitness values;

selecting a subset pair from the chromosome population based on their ranks with higher ranked chromosomes being biased for selection over chromosomes with lower ranks;

randomly selecting a cross-over point to perform a cross-over operation between chromosomes of the selected pair;

performing a cross-over operation between the selected pair, where a portion of their genes are swapped to form a new pair of chromosomes;

repeating the acts of selecting a subset pair, randomly selecting a cross-over point, and performing the cross-over until a sufficient number of selected pairs of chromosomes have been crossed over to equal the number of chromosomes in the initial chromosome population; and evaluating the fitness of each chromosome in the chromosome population by computing the difference between the final desired properties and the actual properties of each chromosome, if the fitness value for any chromosome in the population is above a predetermined threshold, then the design process is terminated and the final design solution[s] are the design parameters of the chromosome[s] that exceed the predetermined threshold value, and if the fitness value for all chromosomes is below the predetermined threshold, then repeating the acts of ranking, selecting, randomly selecting, performing, and repeating until the fitness for any chromosome in the population is above a predetermined threshold.

27. A computer program product as set forth in claim 21, further comprising instruction means for causing a computer to perform a mutation operation where a design parameter of a chromosome is randomly changed into a new value within an allowable range for the design parameter, the mutation operation being performed when a probability threshold is less than a predetermined value.

28. A computer program product as set forth in claim 21, wherein in defining the final desired properties, the final desired properties are shape attributes such that the method comprises an act of defining the final desired shape of the surface.

29. A computer program product as set forth in claim 21, wherein in evaluating the fitness of each chromosome, the fitness value is measured as one over a mean square error between the desired and actual properties of the chromosome.

30. A computer program product as set forth in claim 21, further comprising instruction means for causing a computer to select a design solution from the design solutions based on predetermined limitations.

* * * * *